United States Patent [19]

Jeon

[11] Patent Number: 5,940,017
[45] Date of Patent: Aug. 17, 1999

[54] APPARATUS FOR DECODING VARIABLE LENGTH CODED DATA

[75] Inventor: Jong-gu Jeon, Suwon, Rep. of Korea

[73] Assignee: Samsung Electronics Co., Ltd., Kyungki-do, Rep. of Korea

[21] Appl. No.: 08/935,057

[22] Filed: Sep. 22, 1997

[30] Foreign Application Priority Data

Sep. 20, 1996 [KR] Rep. of Korea ............ 96-41389

[51] Int. Cl.$^6$ ............... H03M 7/40; H03M 7/46
[52] U.S. Cl. ............... 341/67; 348/408; 386/33
[58] Field of Search ............... 341/67; 348/408, 348/420; 386/33, 109

[56] References Cited

U.S. PATENT DOCUMENTS

| | | | |
|---|---|---|---|
| 5,239,308 | 8/1993 | Keesen | 341/67 |
| 5,302,949 | 4/1994 | Yoshinari et al. | 341/67 |
| 5,410,308 | 4/1995 | Keesen et al. | 341/67 |
| 5,570,132 | 10/1996 | De With et al. | 348/408 |
| 5,585,931 | 12/1996 | Juri et al. | 386/33 |
| 5,699,475 | 12/1997 | Oguro et al. | 386/109 |
| 5,781,690 | 7/1998 | Juri et al. | 386/111 |
| 5,852,706 | 12/1998 | Ogikubo et al. | 386/111 |

Primary Examiner—Howard L. Williams
Attorney, Agent, or Firm—Sughrue, Mion, Zinn, Macpeak & Seas, PLLC

[57] ABSTRACT

An apparatus for decoding compressed image data which is variable length coded, having a single segment memory. An input data processor counts the effective AC data and generates an address of where to write the AC data. An MR/VR flag write processor counts all of the MR/VR flags existing in one segment synchronous section stored in the segment memory and generates an address of where to write MR/VR flags existing in the respective DCT blocks. An MR/VR flag memory stores the address of where to write the MR/VR flag generated in the MR/VR flag write processor. An MR/VR flag read address generator generates the address of where to read the MR/VR flag stored in the MR/VR flag memory. An AC data read address generator generates the address of where to read the AC data stored in the segment memory with reference to a start absolute address. A run/amplitude buffer latches the run/amplitude data read from the segment memory. An address reducer clears the latched run and amplitude data before the data of the next area is read, and reduces the address increased due to the run and amplitude in the case where the run does not exist and only amplitude data exists in the data read from the segment memory. A DCT block counter counts the DCT blocks in order to determine in which DCT block the MR/VR data latched in the run/amplitude buffer exists.

4 Claims, 5 Drawing Sheets

APPARATUS FOR DECODING VARIABLE LENGTH CODED DATA

BACKGROUND OF THE INVENTION

1. Field of the Invention

The present invention relates to an apparatus for decoding compressed image data, and more particularly, to an apparatus for decoding compressed image data which is variable length coded to be recorded or transmitted in a format having a fixed area, macroblock remainder (MR) data and video segment remainder (VR) data. The present invention is based on Korean Application No. 96-41389, which is incorporated herein by reference.

2. Description of the Related Arts

In a digital video cassette recorder, one frame of a picture is divided into a plurality of segments, and each segment is divided into five macroblocks. Also, each macroblock includes four DCT blocks for a luminance signal and two DCT blocks for a color difference signal.

A code whose length exceeds the length of the specified fixed area as a result of the variable length coding is called a macroblock remainder (MR). The MR is recorded in the blank area of another DCT block which belongs to the same macroblock. Data remaining after being recorded in the blank area of the other DCT block is video segment remainder (VR) data. The VR data is recorded in the blank area of another macroblock which belongs to the same segment. Any code remaining after being recorded in the blank area of the other macroblock is thrown away. This is because a video segment whose length is fixed is processed independently of other segments during the coding.

During the decoding of compressed data of the video segment unit recorded as described above, fixed data of a DCT block unit is completely decoded first. Then, any existing MR data and VR data are decoded.

However, in a general decoding apparatus, two memories for storing compressed data to be decoded are required so that data of a segment unit being processed is stored in one memory and data of a segment unit to be processed next is stored in the other memory. Since two segment memories are used, hardware costs are increased.

SUMMARY OF THE INVENTION

It is an object of the present invention to provide an apparatus for storing effective fixed data, MR data and VR data of a segment unit and an end flag which indicates an end of the respective data in a memory, for decoding data of a fixed area of a DCT unit, for reading compressed data stored in a memory, using an MR/VR flag which shows whether there is continuous MR/VR data, and for run length decoding the compressed data.

To achieve the above object, there is provided a decoding apparatus, comprising: one segment memory for storing a fixed area, the data of an MR area and a VR area of an input one segment unit, an end flag, and an address corresponding thereto and continuously storing data of other segment units which are input; an input data processor for counting the effective AC data to be written to the segment memory, generating an address of where to write the AC data, processing input data, and outputting the input data to the segment memory; an MR/VR flag write processor for counting all the MR/VR flags existing in one segment synchronous section stored in the segment memory and generating an address of where to write MR/VR flags existing in the respective DCT blocks; an MR/VR flag memory for storing the address of where to write the MR/VR flag generated in the MR/VR flag write processor; an MR/VR flag read address generator for generating the address of from where to read the MR/VR flag stored in the MR/VR flag memory; an AC data read address generator for generating the address of from where to read the AC data stored in the segment memory, with reference to a start absolute address; a run/amplitude buffer for latching the run/amplitude data read from the segment memory; an address reducer for clearing the latched run and amplitude data before the data of the next area is read, and for reducing the address increased due to the run and amplitude in the case where the run does not exist and only amplitude data exists in the data read from the segment memory; a DCT block counter for counting the DCT blocks in order to find in which DCT block the MR/VR data latched in the run/amplitude buffer exist, among the MR/VR flags counted by the MR/VR write processor; a zero flag processor for controlling a process of filling the data before the next DCT block to be latched, with bits having a "0" value, when the MR flag or the VR flag does not exist as determined by the presence of the MR/VR data, in the DCT block which is currently latched, in the MR/VR flag memory; and a run length decoder for run length decoding the data latched in the run/amplitude buffer, and decoding the data before the next DCT block is decoded by filling the data according to the control of the zero flag processor.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 1:
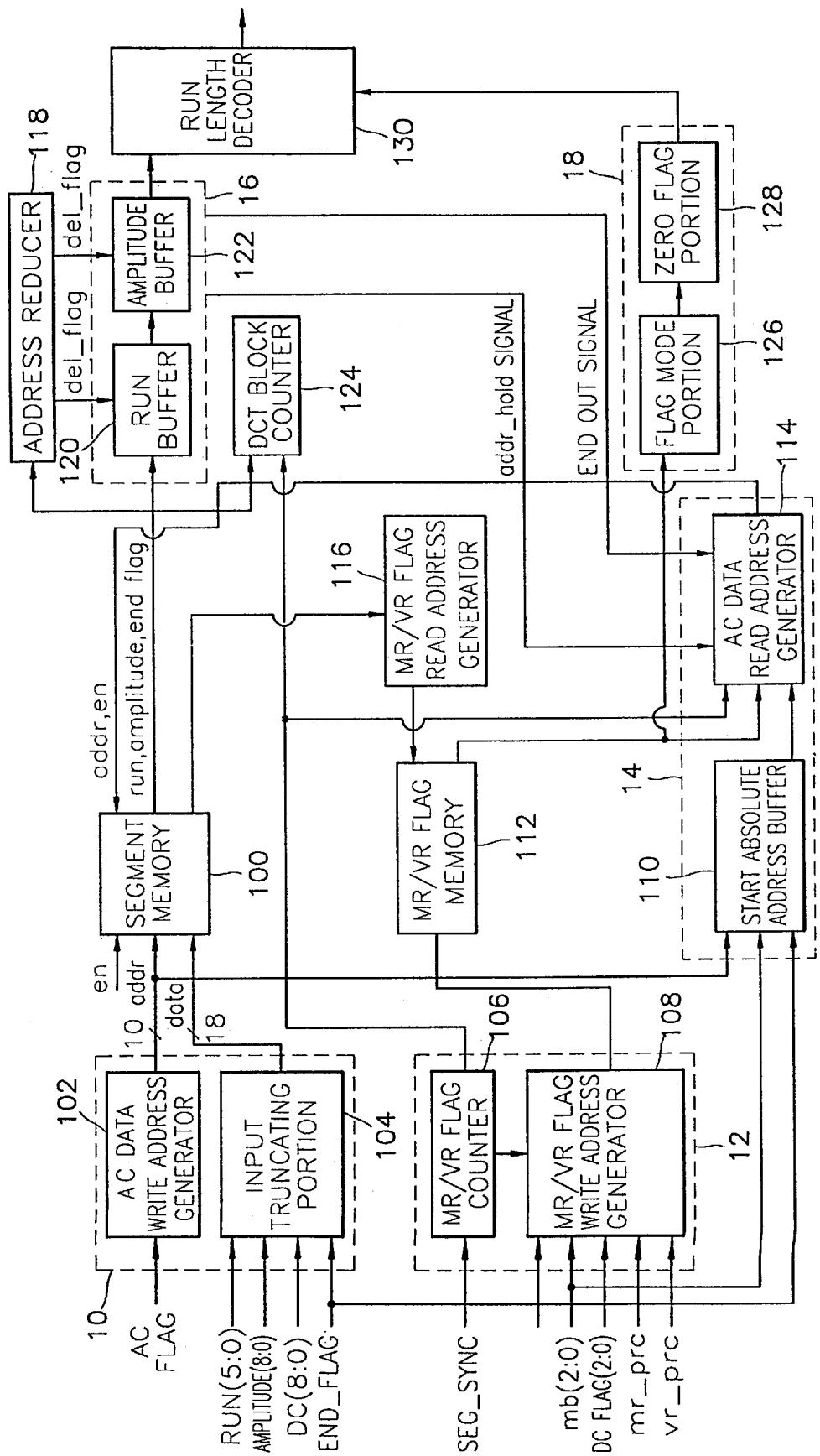
FIG. 1 is a block diagram of a decoding apparatus according to the present invention.

FIG. 1 shows a decoding apparatus according to the present invention. The decoding apparatus includes a segment memory 100, an input data processor 10, an MR/VR flag write processor 12, an MR/VR flag memory 112, an MR/VR flag read address generator 116, an AC data read address generator 14, a run/amplitude buffer 16, an address reducer 118, a DCT block counter 124, a zero flag processor 18 and a run length decoder 130.

The segment memory 100 stores input data of a fixed area of one segment unit and MR and VR areas, an end flag, and an address corresponding thereto, and continuously stores data of another segment unit.

The input data processor 10 counts the effective AC data to write such data to the segment memory 100, generates an address for writing the AC data, processes input data, and outputs the processed data to the segment memory 100. The input data processor 10 includes an AC data write address generator 102 for counting the effective AC data to write to the segment memory 100 and generating the address for writing the counted AC data, and an input truncating portion 104 for converting input data (the AC data, the DC data, and the end flag) into 18-bit data and outputting them to the segment memory 100.

The MR/VR flag write processor 12 counts all of the MR/VR flags which exist in one segment synchronous section and are stored in the segment memory 100 and generates an address for writing the MR/VR flags which exist in the respective DCT blocks.

The MR/VR flag write processor 12 includes an MR/VR flag counter 106 for counting all of the MR/VR flags existing in one segment sync period stored in the segment memory 100, and an MR/VR flag write address generator 108 for generating the address to write the MR/VR flags existing in the respective DCT blocks among the MR/VR flags counted by the MR/VR flag counter 106.

The MR/VR flag memory 112 stores the MR/VR flags generated by the MR/VR flag write processor 12 and an address for writing the MR/VR flags. The MR/VR flag read address generator 116 generates an address for reading the MR/VR flags stored in the MR/VR flag memory 112.

The AC data read address generator 14 generates an address for reading AC data stored in the segment memory 100 with reference to a start absolute address.

The AC data read address generator 14 includes a start absolute address buffer 110 for storing the start addresses of a fixed area, the MR area, and the VR area which are to be read first from the segment memory 100, and an AC data read address generator 114 for receiving the absolute address from the start absolute address buffer 110 and generating an address for reading the AC data stored in the segment memory 100.

The run/amplitude buffer 16 latches the run/amplitude data read from the segment memory 100. The address reducer 118 clears the latched run and amplitude before reading data of the next area and reducing the address increased by the run and amplitude when run does not exist and only amplitude data exist in the data read from the segment memory 100.

The run/amplitude buffer 16 includes a run buffer 120 for latching the run data read from the segment memory 100, and an amplitude buffer 122 for latching the amplitude data read from the segment memory 100.

The DCT block counter 124 counts DCT blocks in order to determine which DCT block includes the MR/VR data latched in the run/amplitude buffer 16 among the MR/VR flags counted by the MR/VR flag write processor 12.

The zero flag processor 18 controls a process of filling the data before the next DCT block is latched with bits having a "0" value when the MR flag or the VR flag does not exist as a result of determining the presence of the MR/VR data in the DCT block which is being latched in the MR/VR flag memory 112.

The zero flag processor 18 includes a flag mode portion 126 for determining the presence of the MR/VR data in the DCT block which is latched in the MR/VR flag memory 112, and a zero flag portion 128 for controlling a process of filling the data before the next DCT block is latched with bits having a "0" value when the MR/VR flags are determined not to exist by the flag mode portion 126.

The run length decoder 130 run length decodes the data latched in the run/amplitude buffer 16 and fills the data before the next DCT block with "0" under the control of the zero flag processor 18.

The detailed operation of the apparatus shown in FIG. 1 is as follows.

Figure 2A:
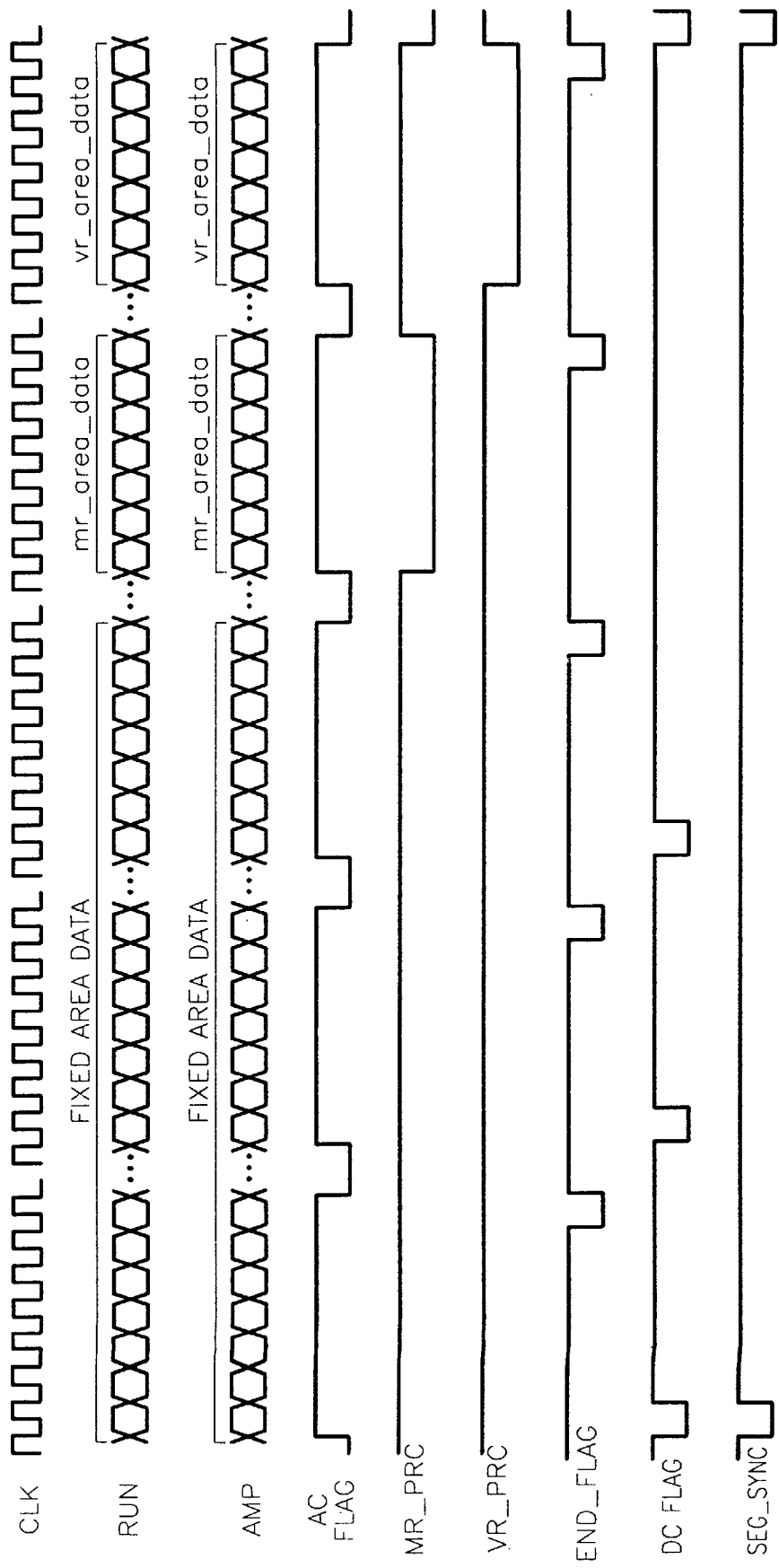
FIG. 2A shows the data input to the segment memory shown in FIG. 1.
Figure 2B:
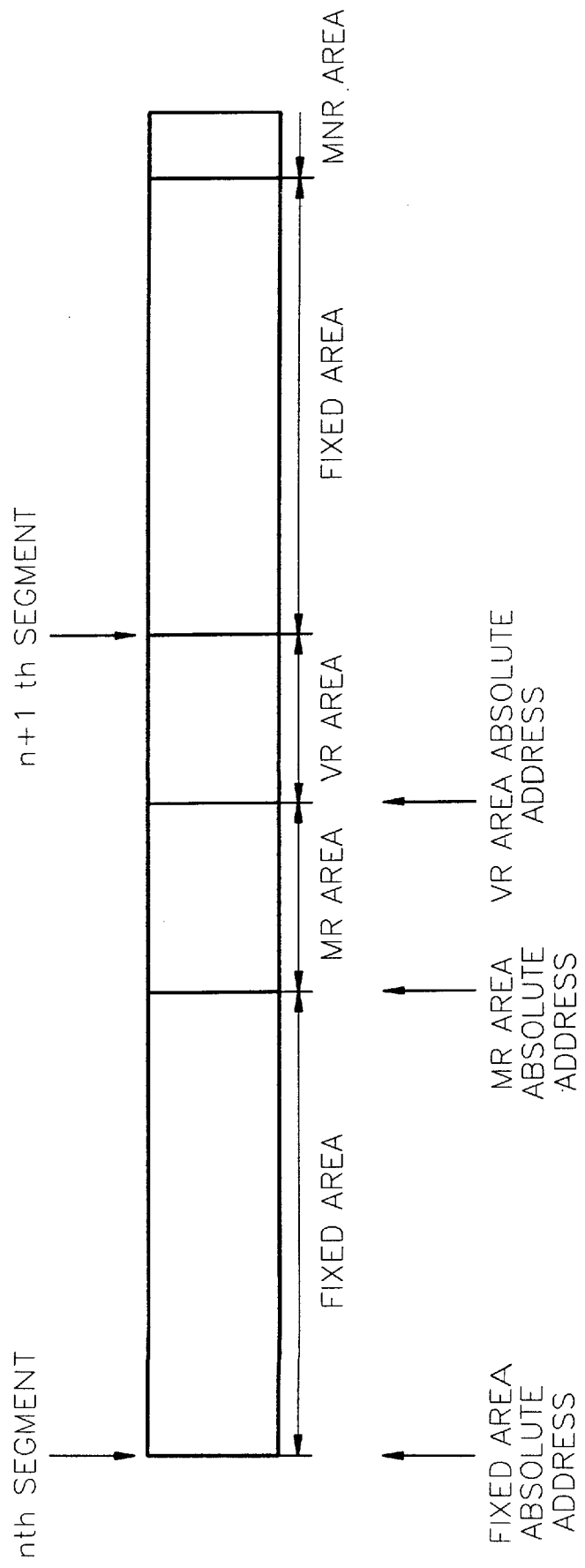
FIG. 2B shows the format of data stored in the segment memory shown in FIG. 1.
Figure 3:
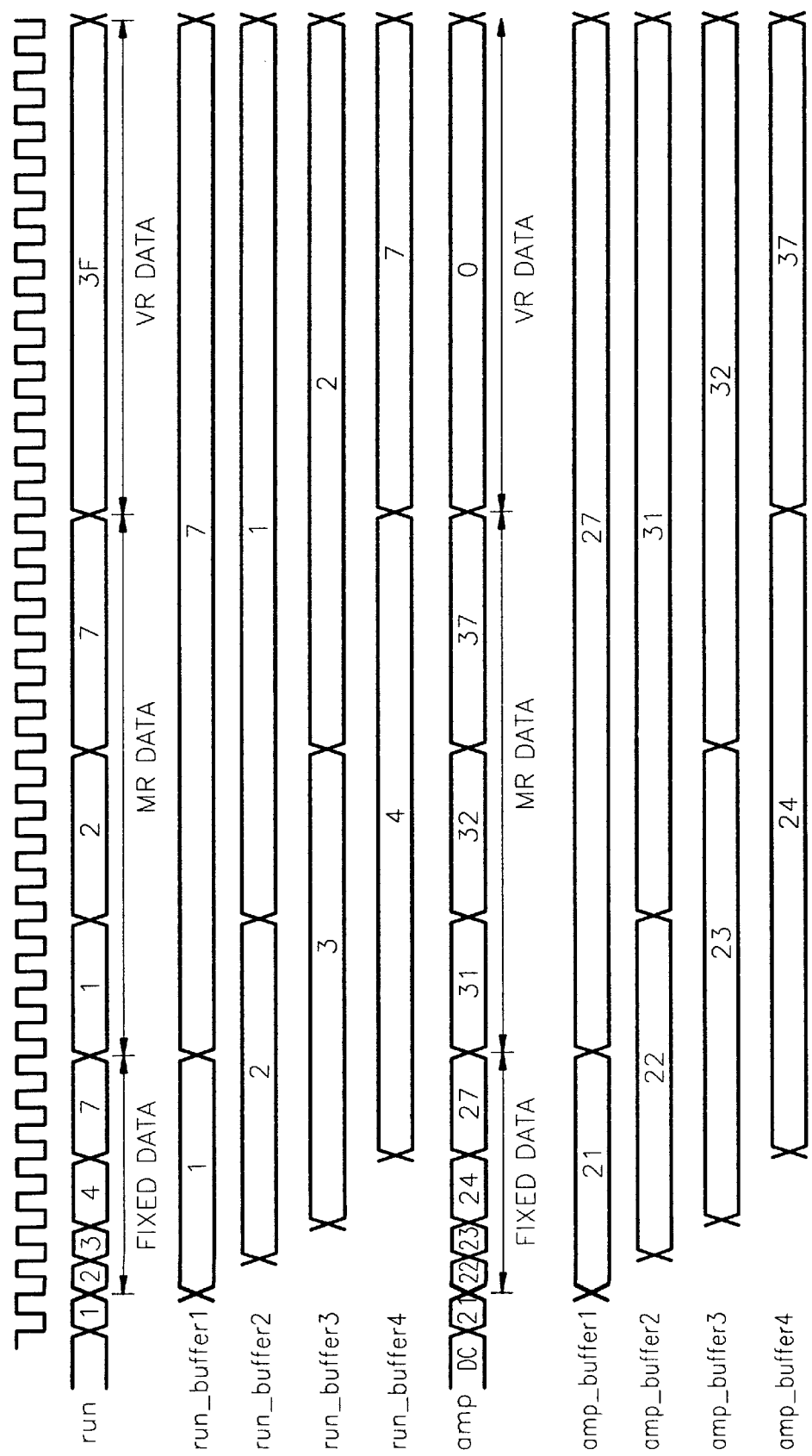
FIG. 3 describes a case in which run exists in data input to the run/amplitude buffer shown in FIG. 1.

FIG. 2A shows the pattern of data input to the segment memory 100 shown in FIG. 1. FIG. 2B shows the format of data stored in the segment memory 100.

The run and amplitude data shown in FIG. 2A, which is effective data, are stored in the segment memory 100 at the address generated by the AC data write address generator 102 for receiving an AC flag. The end flags are recorded on the respective ends of the fixed area, the MR area and the VR area in order to indicate the end of each data. Also, MR_PRC and VR_PRC are signals for showing the effective sections of the MR area and the VR area, respectively, and a DC flag is a signal showing the start of a DCT block.

As shown in FIG. 2B, the segment memory 100 according to the present invention is a memory of a size such that some space remains after data of one segment unit is stored. Data of other segments is continuously stored in the space remaining after the effective data of one segment unit is stored. Therefore, in the present invention, it is possible to reduce the hardware costs by using one segment memory, unlike in a general decoding apparatus in which two segment memories are used.

Data output by the input truncating portion 104 includes DC data of 9 bits, mode data of 1 bit, CLASS data of 2 bits, QNO data of 4 bits, a DC-flag, and an end flag when the DC-flag is low, while the data includes a dummy bit, run data of 6 bits, amplitude data of 9 bits, the DC-flag, and the end flag when the DC-flag is high.

A start absolute address buffer 110, which stores the start address of the fixed area, the MR area and the VR area, includes two buffers for storing the presently processed absolute address of the segment memory 100 and the absolute address to be recorded, respectively.

When the data read from the segment memory 100 by the AC data read address generator 114 is latched to the run buffer 120 and the amplitude buffer 122, the buffers 120 and 122 hold the address, count the run, and increase the address when the run exists (i.e., when the run is not 0). At this time, an address hold signal is output to the AC data read address generator 114.

The AC data read address generator 114 reads data stored in the segment memory 100 using the absolute address of the first fixed area. Then, the AC data read address generator 114 jumps to the absolute address of the MR/VR area depending on the presence of the MR/VR flag read from the MR/VR flag memory 112 by the MR/VR flag read address generator 116, and reads the MR data at the corresponding address stored in the segment memory 100 using the absolute address of the MR area. At this time, the absolute address of the fixed area is updated immediately before being changed to the address of the MR area. The above processes are performed when the processing is changed from the MR area to the VR area. Through the above processes, only fixed data, or the fixed data and the MR data, or the fixed data and the VR data, or the fixed data, the MR data and the VR data can exist in the data decoded by the run length decoder 130.

The run buffer 120 and amplitude buffer 122 store the data read from the segment memory 100 according to the state of the data, using 4 internal buffers. At this time, new data from the segment memory 100 is stored in the respective buffers according to the address change.

Figure 4:
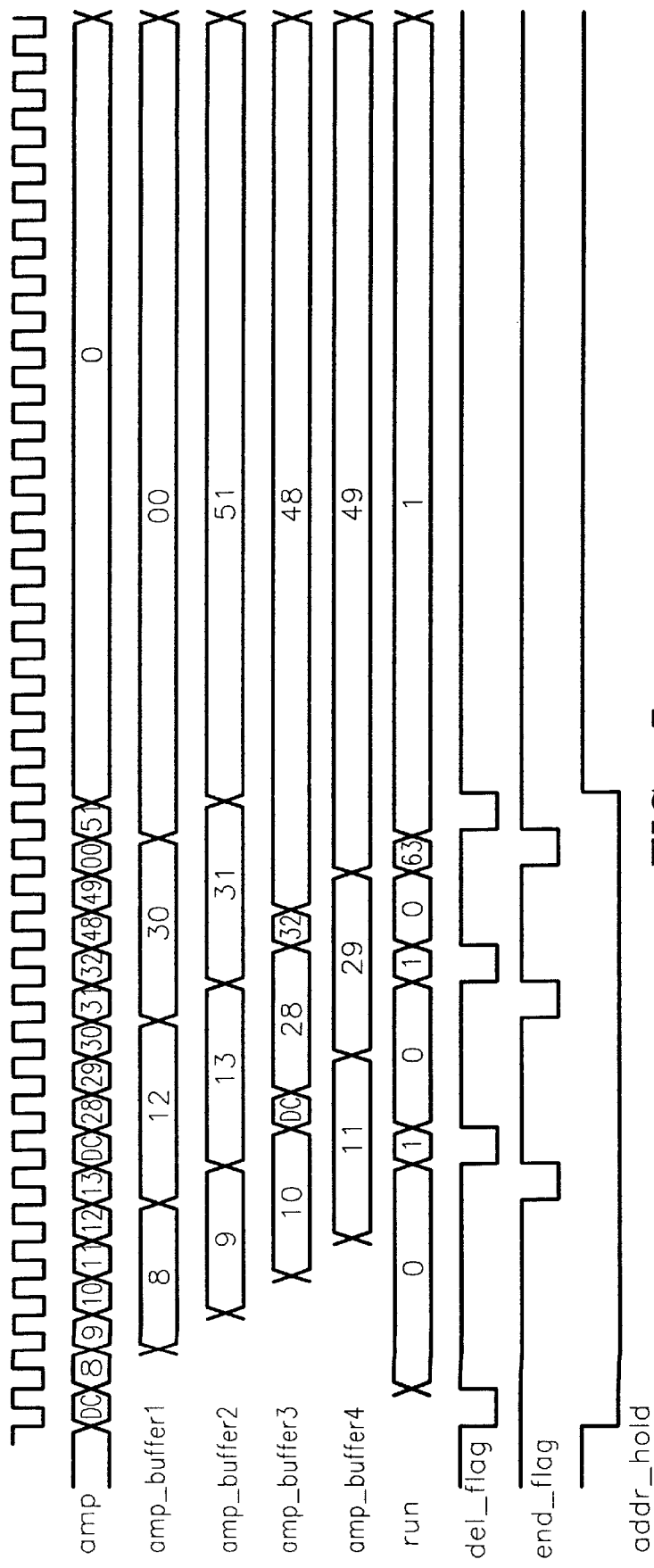
FIG. 4 describes a case in which run does not exist in the data input to the run/amplitude buffer shown in FIG. 1.

The address reducer 118 processes the data of the fixed area when the run exists in the data of the fixed area read from the segment memory 100, and latches the data of the increased address before the address hold signal reaches the AC data read address generator 114 when the data of the MR area or the VR area is processed. For example, when the address is changed from the fixed area to the MR area or from the fixed area to the VR area, one undesired data unit of the next fixed area is read and then the address is changed to the MR area or the VR area. Such a case is shown in FIG. 4. The DC, the amplitude data 32 and the run data 1 shown in FIG. 4 are negligible. At that time, the address reducer 118 reduces the already increased address and removes the redundant run that is generated using a DEL flag.

Figure 5:
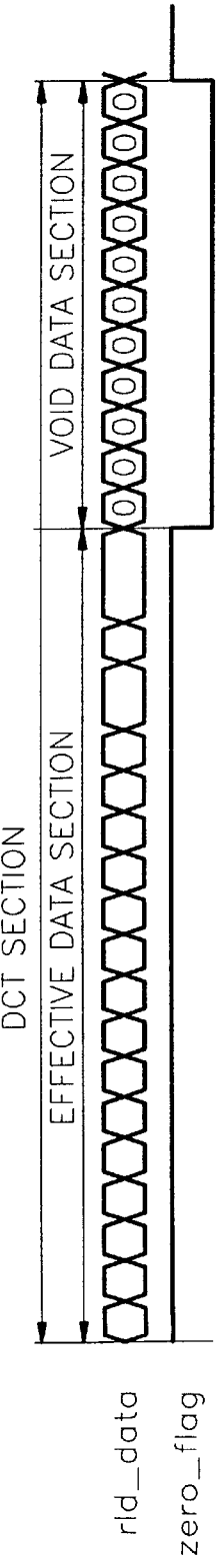
FIG. 5 describes the operation of the zero flag portion shown in FIG. 1.

As illustrated in FIG. 5, the zero flag portion 128 commands the run length decoder 130 to fill the data before the next DCT block with bits having a "0" value when the flag mode portion 126 determines that the MR flag or the VR flag does not exist. The run length decoder 130 fills the data before the next DCT block with bits having a "0" value under the control of the zero flag portion 128 and run length decodes the data latched in the run buffer 120 and the amplitude buffer 122.

As described above, the decoding of data may be performed using a single segment memory according to the present invention.

While only certain embodiments of the invention have been specifically described herein, it will apparent that numerous modifications may be made thereto without departing from the spirit and scope of the invention.

What is claimed is:

1. A decoding apparatus, comprising:

a single segment memory for storing in a fixed area, data of an MR area and a VR area of an input segment unit, an end flag, and an address corresponding to the end flag, and for continuously storing data of other input segment units;

an input data processor for counting AC data to be written to said single segment memory, generating an address of where to write the AC data, processing input data, and outputting the processed input data to said single segment memory;

an MR/VR flag write processor for counting all MR/VR flags existing in one segment synchronous section in said single segment memory and generating a write/read address for MR/VR flags existing in respective DCT blocks;

an MR/VR flag memory for storing the write/read address for the MR/VR flags generated in said MR/VR flag write processor;

an MR/VR flag read address generator for generating the write/read address for the MR/VR flags stored in said MR/VR flag memory;

an AC data read address generator for generating an address for reading the AC data stored in said single segment memory, with reference to start absolute addresses of the fixed area, the MR area, and the VR area;

a run/amplitude buffer for latching run/amplitude data read from said single segment memory;

an address reducer for clearing the latched run/amplitude data before data of a next area is read, and for reducing an address increased by the run and amplitude when the run does not exist and only amplitude data exists in the run/amplitude data read from said single segment memory;

a DCT block counter for counting the DCT blocks in order to determine which DCT block includes the MR/VR data latched in the run/amplitude buffer, among the MR/VR flags counted by said MR/VR write processor;

a zero flag processor for controlling a process of filling the data before a next DCT block to be latched, with bits having a "0" value, when the MR flag or the VR flag does not exist as determined by the presence of the MR/VR data, in the DCT block currently latched in said MR/VR flag memory; and a run length decoder for run length decoding the latched run/amplitude data in said run/amplitude buffer, and decoding the run/amplitude data before the next DCT block is decoded by filling the data under a control of said zero flag processor.

2. A decoding apparatus according to claim 1, wherein said AC data read address generator includes a start absolute address buffer for storing the start addresses of the fixed area, the MR area, and the VR area which are to be read from said single segment memory, and an AC data read address generator for receiving the start absolute addresses from said start absolute address buffer and generating the address for reading the AC data stored in said segment memory.

3. A decoding apparatus according to claim 1, wherein said run amplitude buffer includes a run buffer for latching the run data read from said single segment memory, and an amplitude buffer for latching the amplitude data read from said single segment memory.

4. A decoding apparatus according to claim 1, wherein said zero flag processor includes a flag mode portion for determining the presence of the MR data and the VR data in the DCT block which is latched in said MR/VR flag memory, and a zero flag portion for controlling the process of filling the data.

* * * * *